United States Patent [19]
Walter et al.

[11] Patent Number: 4,572,591
[45] Date of Patent: Feb. 25, 1986

[54] BALL BEARING ARRANGEMENT FOR LONGITUDINAL MOVEMENT ON A SHAFT OR THE LIKE

[75] Inventors: Lothar Walter, Schweinfurt; Walter Reith, Bad Bocklet; Otmar Winkler, Schweinfurt, all of Fed. Rep. of Germany

[73] Assignee: SKF Kugellagerfabriken GmbH, Schweinfurt, Fed. Rep. of Germany

[21] Appl. No.: 639,100

[22] Filed: Aug. 9, 1984

[30] Foreign Application Priority Data

Sep. 2, 1983 [DE] Fed. Rep. of Germany ... 8325205[U]

[51] Int. Cl.$^4$ ............................................. F16C 29/06
[52] U.S. Cl. .................................................. 308/6 C
[58] Field of Search ...................... 308/6 C, 6 R, 6 A; 464/168

[56] References Cited

U.S. PATENT DOCUMENTS

| | | | |
|---|---|---|---|
| 3,512,849 | 5/1970 | Weisel | 308/6 C |
| 3,844,629 | 10/1974 | Haines | 308/6 C |
| 3,955,857 | 5/1976 | Schurger et al. | 308/6 C |
| 4,327,949 | 5/1982 | Borel | 308/6 C |
| 4,344,657 | 8/1982 | Borel | 308/6 C |
| 4,421,363 | 12/1983 | Olschewski et al. | 308/6 C |

FOREIGN PATENT DOCUMENTS 1268442 8/1963 Fed. Rep. of Germany.

*Primary Examiner*—Stuart S. Levy
*Assistant Examiner*—Lynn M. Sohacki
*Attorney, Agent, or Firm*—Yuter, Rosen & Dainow

[57] ABSTRACT

A ball bearing arrangement for longitudinal movement on a shaft or the like comprising a sleeve-shaped cage having a plurality of outwardly directed, axially aligned recesses, in each of which a raceway plate is inserted. Each raceway plate has a closed raceway formed thereon. An endless row of balls is arranged between each raceway plate and the cage. The cage has a plurality of guideways connecting the recesses with the cage bore and guiding the load-bearing balls. The angular distances between the load-bearing balls of adjacent endless rows are unequal. The raceway plates are interchangeable. Therefore, in the construction of each variation only a new cage need be provided.

6 Claims, 10 Drawing Figures

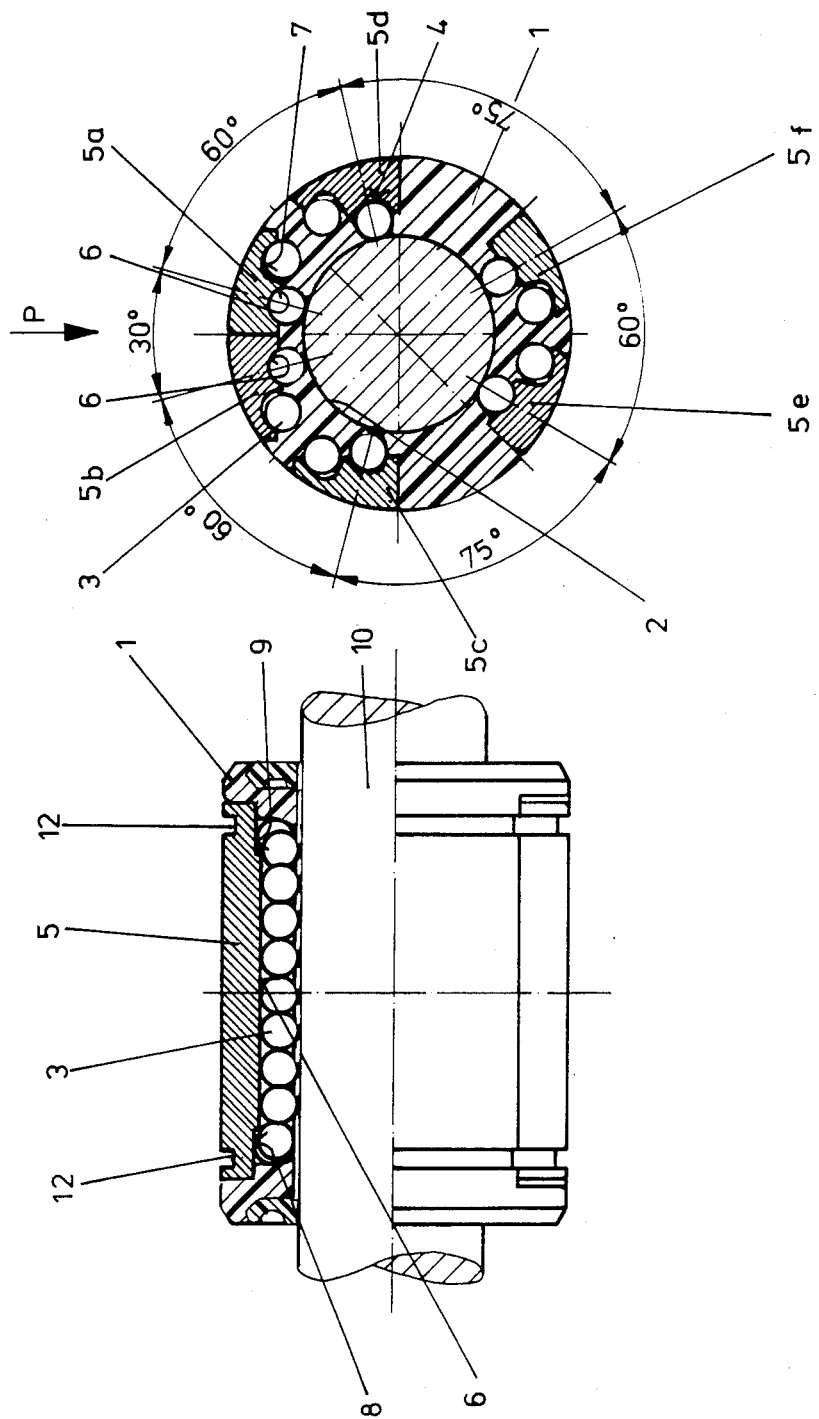

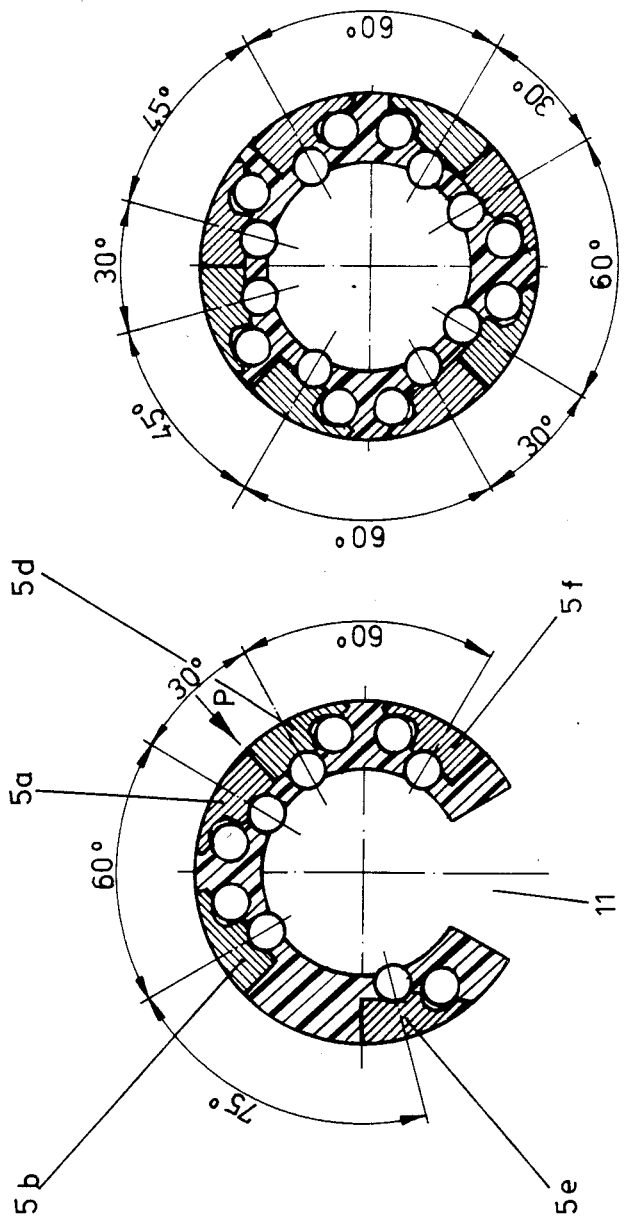

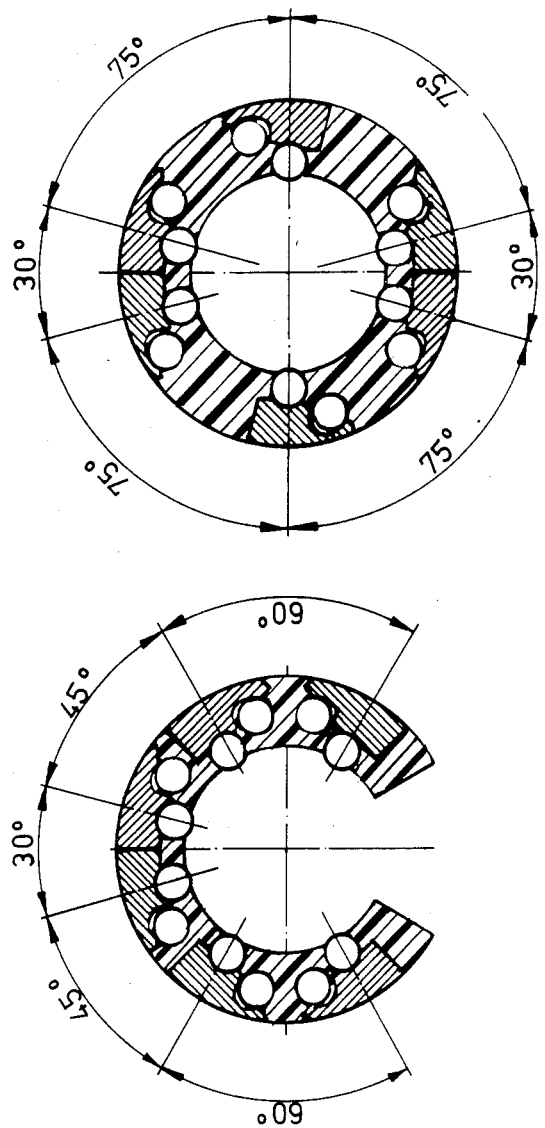

BALL BEARING ARRANGEMENT FOR LONGITUDINAL MOVEMENT ON A SHAFT OR THE LIKE

BACKGROUND OF THE INVENTION

This invention relates to a ball bearing arrangement for longitudinal movement on a shaft or the like having several endless rows of balls circumferentially distributed around a sleeve-shaped cage. The cage is provided with radially outwardly facing recesses into which raceway plates are inserted.

A ball bearing arrangement of this type is disclosed in German patent No. DE-PS 12 68 442. According to this construction, however, the endless rows are symmetrically arranged, i.e. circumferentially distributed with equal angular distances between adjacent load-bearing rows.

Furthermore, it is also known that endless rows of balls may be arranged so that the load-bearing raceways of paired adjacent endless rows of balls are formed next to each other in a common raceway plate ([U.S. Pat. No. 3,844,629 Belgian patent publication No. BE-PS 80 36 34]). However, in accordance with this known construction, the raceway plates and the double raceways formed therein are circumferentially distributed such that equal angular distances separate adjacent pairs of load-bearing raceways.

The above arrangements are designed to operate with symmetrically, circumferentially distributed loads. In particular, in the case in which a force is exerted only in a predetermined direction, the ball bearings must often be oversized, since small load-bearing raceways are provided in the zone of load distribution. In addition, the raceway plates only encompass the load-bearing raceway portions, while the remaining portions of the raceways are arranged in the cage. This places stringent requirements on the manufacturing tolerances and can under unfavorable conditions lead to abrasion in the transfer zone and the production of noise.

SUMMARY OF THE INVENTION

It is the object of the present invention to provide a ball bearing of the above-described type which is particularly adapted to withstand forces acting in predetermined directions, whereby the possibility of variation in the construction of the bearing is provided in a simple manner. In addition, each raceway plate encompasses the entire closed path traveled by the circulating balls.

According to the present invention this problem is solved by forming the ball rows such that the angular distances between adjacent load-bearing raceways is unequal. Each raceway plate has a closed raceway incorporated therein for forming one side of the guideway in which the endless row of balls circulate.

As a result of this arrangement, it is possible to concentrate the endless rows in the area where the greatest loads are exerted, i.e., to make the angular distance between adjacent load-bearing raceways small, whereas in the area where no or small loads arise, only a few endless rows are arranged, i.e., the angular distance is larger. This arrangement provides more load-bearing rows in the loading direction. Furthermore, by non-aligned insertion of the ball bearing, there is a greater likelihood that advantageous placement of the ball rows will be attained. The same raceway plates can then be employed in different embodiments. Only the cage must be adapted to conform to the desired arrangement.

Thus, the present invention makes inexpensive manufacture of the ball bearing possible.

According to the further feature of the present invention, each raceway plate has a closed i.e. continuous raceway formed therein, comprised of an axially running, load-bearing raceway portion, an axially running return travel raceway portion, and a pair of semicircular reversal portions, connecting the ends of the axially running raceway portions. Thus, it is possible to not only use each raceway plate in an optional arrangement, but also to better utilize the plate's axial length in order to obtain a higher load capacity. Moreover, the balls of each row will be guided smoothly by the closed raceway, without discontinuity or misalignment arising.

In accordance with a further feature of the present invention, the raceway plates can be arranged either symmetrically or asymmetrically relative to the central plane of the bearing.

In accordance with another feature, the outer surface of each raceway plate is formed with at least one groove running transverse to the longitudinal direction for receiving a spring ring or the like. This spring ring, on the one hand, aids in the axial fixation of the raceway plates and, on the other hand, serves in the axial fixation of the bearing in the housing or the like. As a result, greater axial forces can be transmitted.

BRIEF DESCRIPTION OF THE DRAWINGS

The preferred embodiments of the present invention will be described in greater detail with reference to the following drawings, wherein:

FIG. 1 is a longitudinal section of a ball bearing arrangement for longitudinal movement on a shaft or the like;

FIG. 2 is a transverse section of the ball bearing arrangement of FIG. 1;

FIGS. 3–6 are transverse sections of different embodiments of the present invention, each incorporating the same raceway plates.

DETAILED DESCRIPTION OF THE PREFERRED EMBODIMENT

The ball bearing arrangement for longitudinal movement on a shaft shown in FIGS. 1 and 2 comprises a cage 1 made of, for example, plastic, in which several circumferentially, asymmetrically distributed endless rows 2 of balls 3 are arranged. In the area of each row 2, the cage 1 is provided with radially outwardly facing recesses 4, in which raceway plates 5a to 5f are inserted. Guideways are formed in the cage, connecting the recesses with the bore of the cage and guiding the load-bearing balls during operation. Each raceway plate 5 is formed with two axially running and radially offset raceway portions 6 and 7 arranged next to each other and the ends of which are connected by semicircular reversal raceway portions 8 and 9 (not shown in detail), all on one radial side of the plate. The balls 3 of the endless rows 2 are guided between raceways 6–9 and the corresponding raceways formed in the cage 1.

In the area of the raceway portions 6, the balls 3 are in contact with the shaft 10. Raceway portions 6 thus serve as the load-bearing raceways. In the area of the raceway portions 7, the balls 3 are not in contact with the shaft 10, these portions thereby forming return travel raceways.

Grooves 12 are formed on the outer surface of each raceway plate 5 in the area of the ends, each groove running transverse to the longitudinal direction. The grooves 12 continue in the outer surfaces of the cage 1, thereby forming annular grooves for receiving retaining rings (not shown). These retaining rings not only engage the raceway plates 5 and the cage 1, thereby axially fixing the raceway plates relative to the cage, but also serve to axially fix the ball bearing in the housing.

The recesses 4 and the raceway plates 5 are—according to the embodiment of FIGS. 1 and 2, in which the main direction of the loading (P) on the bearing is along the normal from above (see FIG. 2)—arranged such that in the upper vertex of the ball bearing, the faces of the adjacent raceway plates 5a and 5b abut and the load-bearing raceway portions 6 of both raceway plates lie as close to one another as possible. The load-bearing raceway portions 6 of these adjacent raceway plates 5c and 5d are arranged such that the load-bearing raceway portions of raceway plates 5b and 5c and the load-bearing raceway portions of raceway plates 5a and 5d respectively form angles of 60° with the axis of shaft 10. In the lower vertex of the ball bearing the raceway plates 5e and 5f are arranged next to each other such that the return travel raceways 7 of both raceway plates 6 are adjacent to each other The load-bearing raceway portions 6 of raceway plates 5e and 5f form an angle of 60° with the axis of shaft 10. The load-bearing raceway portions of raceway plates 5c and 5e and the load-bearing raceway portions of raceway plates 5d and 5f respectively form angles of 75° with the axis of shaft 10.

The embodiment shown in FIG. 3 is of the open configuration type, wherein the shaft 10 is supported by columns or similar means. For this purpose, the ball bearing has a section 11 cut out. In the cage 1 of this embodiment, five raceway plates 5 are provided. Because load P is applied along a main direction lying at an angle of 45° with respect to the vertical plane through the shaft axis, the raceway plates 5a and 5d are arranged with their faces abutting such that the plane of contact lies at the same 45° angle. At the same time the load-bearing raceway portions of raceway plates 5a and 5b and the load-bearing raceway portions of raceway plates 5d and 5f respectively form angles of 60° with the shaft axis. The load-bearing raceway portion of raceway plate 5e may be positioned so as to form an angle of 75° with the load-bearing raceway portion of adjacent raceway plate 5b. A person having ordinary skill in the art will recognize that it is possible to arrange an additional raceway plate between raceway plates 5b and 5e. It should be pointed out, however, that in the open configuration embodiment of the present invention, the additional raceway plate is unnecessary.

The arrangement shown in FIGS. 4 and 5 is suitable for large loads from all directions, wherein FIG. 4 shows the closed configuration and FIG. 5 shows the open configuration. For mutually opposite loads acting in a plane, the embodiment shown in FIG. 6 is suitable.

The foregoing description of the preferred embodiments is presented for illustrative purposes only and is not intended to limit the scope of the present invention as recited in the appended claims. Modifications may be readily effected by one having ordinary skill in the art without departing from the spirit and scope of the inventive concept herein disclosed.

What is claimed is:

1. In a ball bearing arrangement for longitudinal movement on a shaft or the like and comprising an at least partially sleeve-shaped cage with a plurality of substantially axially aligned recesses formed in the radially outer surface of said cage and a plurality of guideways for guiding load-bearing balls during movement, each said guideway comprising an aperture extending between one of said recesses and the bore of said cage, a plurality of raceway plates inserted in said recesses, and a plurality of endless rows of balls arranged between said raceway plates and said cage, the improvement wherein each of said raceway plates is formed with a closed raceway on the inner radial side thereof for guiding an endless row of said balls, said closed raceway comprising an axially extending load-bearing raceway portion, an axially extending return travel raceway portion, and a pair of reversal raceway portions joining the load-bearing and return travel raceway portions of the respective plate, the angular distances between load-bearing raceway portions of adjacent plates varying about the circumference of said cage.

2. A ball bearing arrangement as defined in claim 1, wherein the load-bearing raceway portions are symmetrically arranged with respect to a central axial plane.

3. A ball bearing arrangement as defined in claim 1, wherein the load-bearing raceway portions are asymmetrically arranged with respect to a central axial plane.

4. A ball bearing arrangement as defined in claim 1, wherein the outer surface of each raceway plate has at least one groove running transverse to the longitudinal direction enabling holding of the bearing arrangement together.

5. A ball bearing arrangement as defined in claim 1, wherein at least one of said recesses in said cage receives two of said raceway plates.

6. A ball bearing arrangement as defined in claim 1, wherein all of said raceway plates are interchangeable.

* * * * *